United States Patent [19]

Sandy et al.

[11] 4,246,808
[45] Jan. 27, 1981

[54] PRECISION SMALL WIRE STRIPPER AND BLADE STRUCTURE

[75] Inventors: Julius W. Sandy; Marvin J. Peplow, both of Sycamore; Elmer W. Baneck, Genoa, all of Ill.

[73] Assignee: Ideal Industries, Inc., Sycamore, Ill.

[21] Appl. No.: 19,262

[22] Filed: Mar. 9, 1979

[51] Int. Cl.³ .............................................. H02G 1/12
[52] U.S. Cl. .................................. 81/9.5 R; 30/90.1
[58] Field of Search ........................ 30/90.1; 81/9.5 R

[56] References Cited

U.S. PATENT DOCUMENTS

| | | | |
|---|---|---|---|
| 3,151,509 | 10/1964 | Gormley | 81/9.5 R |
| 3,336,666 | 8/1967 | Calkin | 81/9.5 R X |
| 3,528,325 | 9/1970 | Kamimura et al. | 81/9.5 R |
| 3,557,643 | 1/1971 | Weglin | 81/9.5 R |
| 4,047,297 | 9/1977 | Hanson | 30/90.1 |
| 4,130,031 | 12/1978 | Wiener et al. | 81/9.5 R |

Primary Examiner—James G. Smith
Attorney, Agent, or Firm—Kinzer, Plyer, Dorn & McEachran

[57] ABSTRACT

A tool for stripping the insulation material from fine wires without nicking or damaging the conductor portion of the wire. The tool has a pair of cutting blades mounted on elongated members with handle means attached for manipulation of the tool. Cutting edges are provided on opposing sides of each blade. The blade structures are self-aligning to assure the proper severing of insulation material. Alignment means are incorporated in the blade structure such that the blade pairs are interchangeable. A wire guide is provided to position wires between the blades at the precise location for stripping.

10 Claims, 7 Drawing Figures

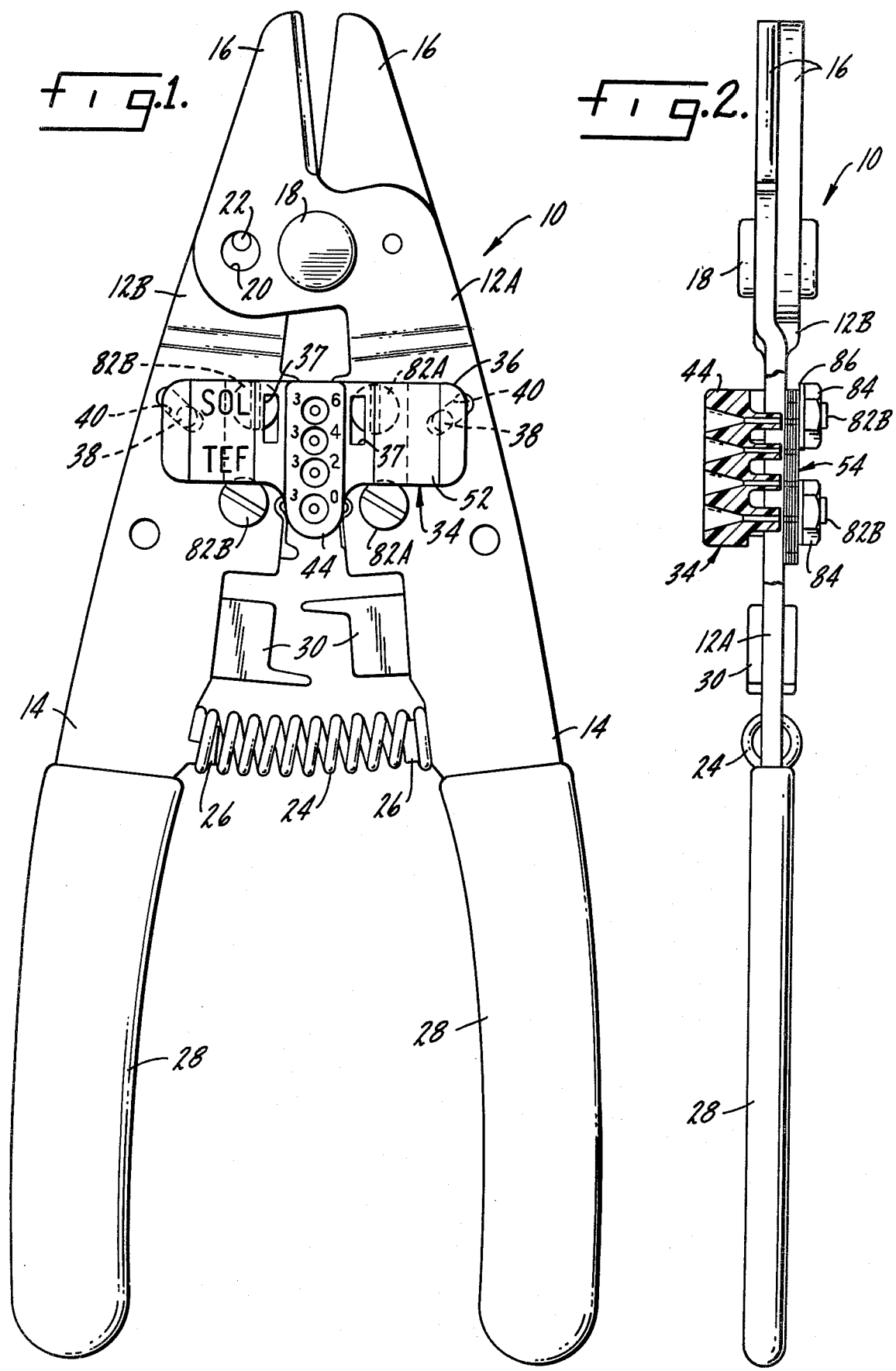

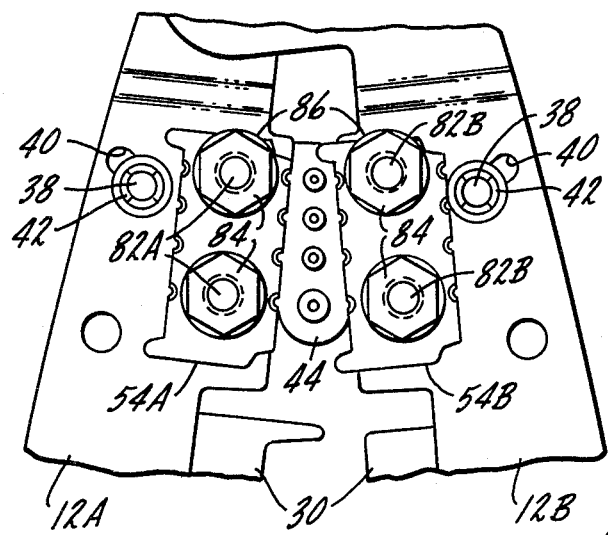
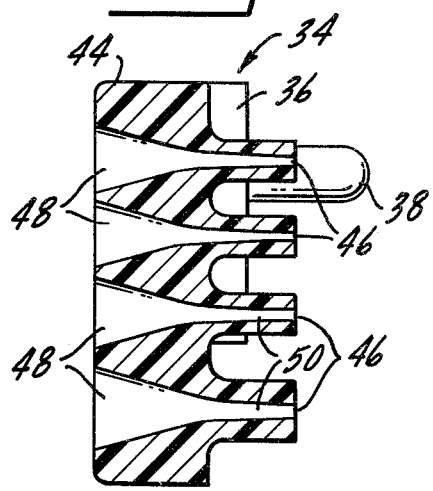
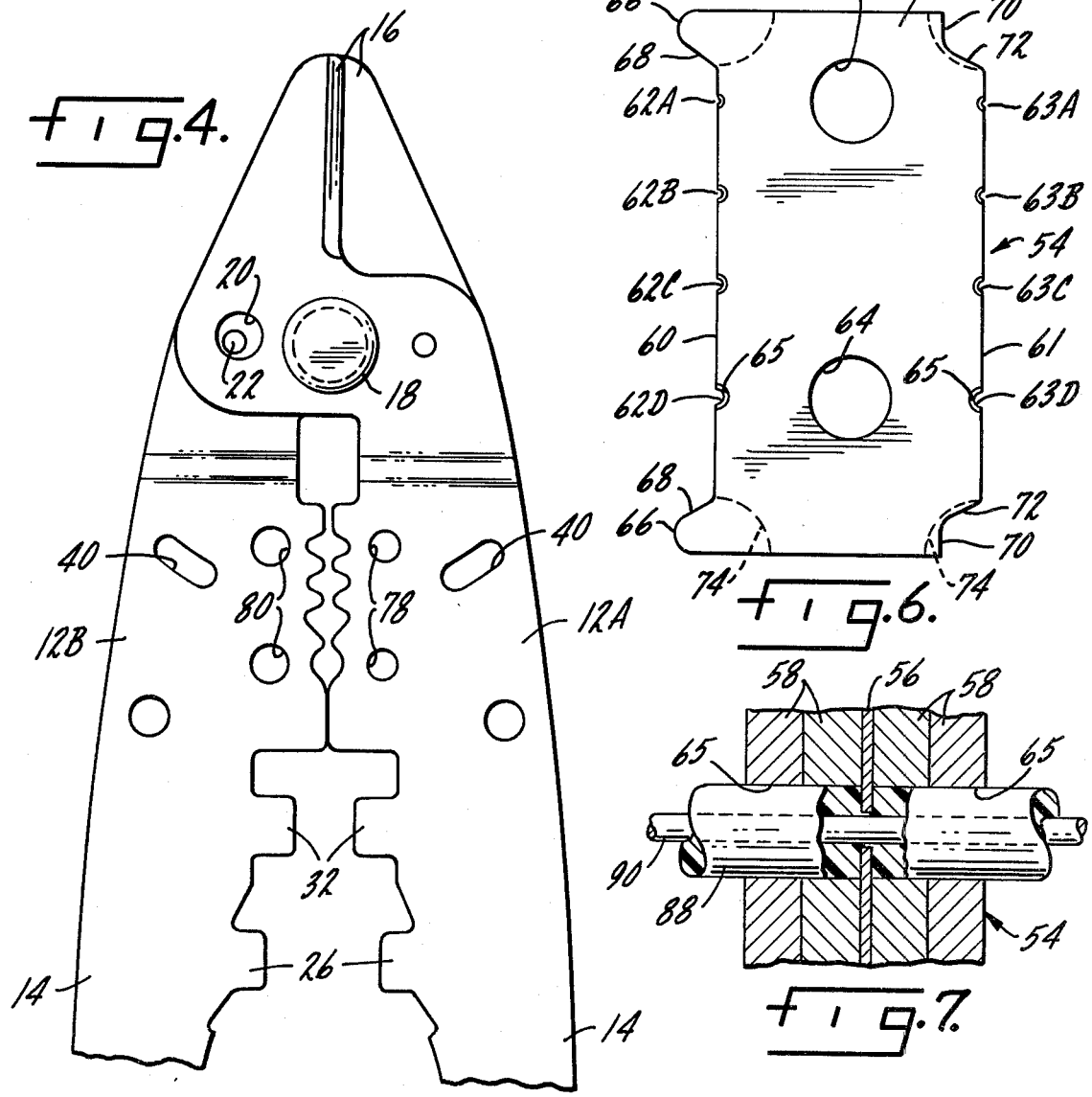
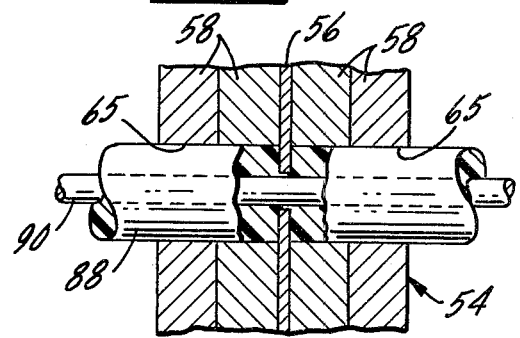

PRECISION SMALL WIRE STRIPPER AND BLADE STRUCTURE

SUMMARY OF THE INVENTION

This invention is concerned with a precision hand tool useful for stripping the insulation material from an insulated wire. It is particularly concerned with a tool for use with fine gauge insulated wire.

An object of this invention is the removal of thin, tough insulation from small conductor wires with minimum effect to the conductor.

Another object is a tool for removing insulation which can be used on a plurality of wire sizes.

Another object is a tool of the above type which has a wire guide for positioning wires between the cutting blades for stripping.

Another object is a blade structure for a wire stripping tool which is self-aligning.

Another object is a blade structure which is double-edged and, therefore, reversible.

Another object is a tool of the above type which has releasable mounting means for the cutting blades.

Another object is a tool of the above type where the blade structure assists in aligning the tool handles in a plane perpendicular to the plane of the handles.

Another object is a tool capable of stripping fibre optics.

Another object is a tool wherein the cutting blade can be made as a stamped part.

Other objects will be apparent from the following specifications, claims and drawings.

BRIEF DESCRIPTION OF THE DRAWINGS

The invention is illustrated more or less diagramatically in the following drawings wherein:

FIG. 1 is a front elevational view on an enlarged scale of a tool embodying the novel features of this invention;

FIG. 2 is a side elevational view of the tool of FIG. 1 with portions cut away to show the wire guide in cross-section;

FIG. 3 is a partial view of the reverse side of a tool from that shown in FIG. 1;

FIG. 4 is a front elevational view of the handle blanks of the present invention with the wire guide and cutting blade assemblies removed;

FIG. 5 is an enlarged cross-sectional view of a wire guide;

FIG. 6 is an enlarged elevation view of a blade assembly;

FIG. 7 is an enlarged detail in cross-section, showing engagement of a wire between a cooperating set of cutting blades.

DETAILED DESCRIPTION OF THE INVENTION

FIG. 1 of the drawings shows a hand-held tool 10 which may be used for cutting and stripping insulation from fine gauge wires. The tool is especially useful in stripping synthetic insulation or plastics which are extremely tough and difficult to cut. The tool includes two elongated members 12A and 12B of almost identical construction. Conveniently, these members may be metal stampings. Each elongated member includes a handle portion 14 and a wire cutting blade portion 16. The blade portion for each member is offset both from the axis of the handle portion and laterally from the plane of the handle portion. The offset of the blade portion from the plane of the handle portion is equal to one half the thickness of the handle portion so that the blade portions are flush with each other when the handle portions are aligned as shown in FIG. 2. The upper and lower elongated members 12A and 12B are pivotally connected by a rivet 18 extending through openings (not shown) in the offset portions of the members. Each wire cutting blade portion includes a hole 20 and a projecting pin 22, each located on opposite sides of the rivet opening. The pin 22 may be formed by a stamping operation in the member 16. The projecting pin of one member fits into the hole 20 of the other member with the pin and hole forming stop means to limit opening pivotal movement of the elongated members 12 relative to each other.

A compression spring 24 fits over projections 26 formed on the handle portions 14 to bias the handle portions away from each other. Insulating sheaths 28 fit over the handle portions outwardly of the compression spring 24. The insulating material may be vinyl or other suitable material. A pair of untwisting pads 30 may be mounted on projections 32 (FIG. 4) formed on the handle portions 14 adjacent to the projections 26. The pads 30 are formed of a suitable relatively soft plastic such as nylon and are of identical construction. The pads may be closed on a pair of twisted wires to form a restricted passage so that pulling the wires through the passage will untwist them.

A wire alignment guide 34 formed of a suitable plastic such as nylon is mounted on the front side of the tool as seen in FIG. 1. The wire alignment guide includes an elongated rectangular base 36 which extends between the elongated members 12. The base has a pair of slots 37 extending through it. Stubs 38 formed on the underside of the base extend through arcuate slots 40 formed in the elongated members 12A or 12B. Spring-like locking fasteners 42 fit over the stubs and hold the wire alignment guide in position on the tool. The stubs are permitted to move in slots 40 so the guide position can float as the handles are manipulated. The side of the base opposite from the stubs has an upstanding locator portion 44 formed thereon. A plurality of wire-guiding openings or holes 46 extend through the locator portion. Each of the openings has a funnel-shaped entrance 48 which merges with a cylindrical passage 50. The cylindrical passage has a diameter substantially equal to the outside diameter of the insulation of the wire to be stripped. Each of the holes 46 will have a different diameter to accomodate a different gauge wire. In molding this plastic wire guide, the passages 50 are all made with minimum size holes and then the larger sizes can be made by drilling them out. This way only one set of molding dies is required. Also, there is a molded recessed area 52 on each side of the locator portion 44. This can be used for product identification or to apply informational decals telling the user what size or type of wire the tool is designed for. Likewise the locator portion 44 may have information printed thereon designating the wire size to be used in each hole.

This tool is designed for use with very fine gauge wire, for example, 36 gauge solid Teflon wire. This wire has an outside insulation diameter on the order of 0.0120 inches. Cutting apertures for severing the insulation on such wires need to be on the order of 0.005 inches in diameter. Only a tool with precision alignment of its handle members and blades will properly strip wire of this size. The present invention accomplishes this through the use of double-edged, interchangeable blade assemblies 54(FIG. 6). These are mounted on each of the elongated members 12A or 12B by mounting means which will be described below.

As seen in FIG. 7, the blade assembly 54 comprises several layers forming a sandwich-type construction. In the center is a blade member 56 which is surrounded by one or more backup or support members 58. In the embodiment shown there are two support members on each side of the blade but it will be understood that the precise number of support members is not critical and it could be other than the number shown.

Each cutting blade assembly 54 is double-edge. Thus, there are two cutting edges 60 and 61. The blade member 56 has a series of semi-circular notches 62 A-D along the first edge 60, and a similar set of notches 63 A-D along the second edge 61. When the handle members are manipulated to bring two cooperating blade assemblies together, the edge 60 of one assembly will adjoin the opposite edge 61 of the other blade assembly. Corresponding notch pairs, such as 62A and 63A will be aligned to form a circular aperture that does the cutting of insulation material. Each of the notches has a different size to accomodate different wire gauges. It will be understood that the particular number of notches along a cutting edge could be other than as shown.

Each blade assembly has a pair of blade holes 64 which are precisely located so that when a bolt is placed through them all the parts of the blade assembly are lined up from top to bottom and edge to edge. The only portion of the blade assembly where all parts of the sandwich are not co-extensive is the notches 62A-D and 63A-D. Each of the support members is indented as at 65 to expose a small portion of each notch in the cutting member 56. Elsewhere along the cutting edges 60 and 61 the support members 58 and the cutting blade 56 are co-extensive so that the blade 56 is not exposed.

Each blade assembly 54 has an alignment means built into it. This comprises a set of alignment pegs 66 located at the ends of the first cutting edge 60. Each peg has an angled surface 68 facing in the direction of the opposite peg. On the second cutting edge 61 is a pair of cutouts or seats 70. These have an angled surface 72 which is designed to engage the angled surfaces 68 of an opposing blade assembly to align the blades in a direction both parallel to the cutting edges and perpendicular to the cutting edges. The pegs 66 and seat 70 each have a depth which will provide for the proper separation of the blades, that is, the pegs 66 will fit down into the seats until the opposing cutting edges are just barely touching. The peg and seat structure is made entirely in the support members 58 of the blade assembly 54. The corners of the blade member 56 are cut out as at 74 to preclude an interference with the alignment means.

The elongated members have holes for mounting the blade assemblies. These are shown at 78 on the upper elongated member 12A. The holes 78 are precisely located and have the same diameter as the blade holes 64. The corresponding holes 80 in the lower elongated member 12B have an enlarged diameter over that of the blade hole 64 and the holes 78 in the upper member 12A. Pairs of mounting bolts 82A and 82B hold a blade assembly 54 to each of the elongated members 12A and 12B. Each bolt is held in place by a nut 84. There may also be a washer 86 between the nut and the cutting blade assembly.

The diameter of the mounting bolts 82A is very nearly equal that of the blade holes 64. Only a very slight clearance is allowed, on the order of 0.001 inches. Thus, when a bolt is placed through a blade assembly the parts of the sandwich are held fixed in place and will not move relative to each other. Similarly, when the bolts 82A are placed through the holes 78 in the elongated member 12A the very tight clearance will permit no motion between the blade assembly and the member. Thus, insertion of a bolt through blade holes 64 and mounting holes 78 will fix a first cutting blade assembly in position.

In contrast, when a second cutting blade assembly is mounted by bolts 82B to the lower elongated member 12B through enlarged holes 80, some movement of the second blade assembly can take place, at least before the nuts are tightened, because the holes 80 have a larger diameter than the bolts 82B. Thus when a new set of blades is mounted on the elongated members the alignment of the blades can be assured by the following method. Referring to FIg. 3, a first cutting blade assembly 54A is mounted in position and the bolts are tightened. A second cutting blade assembly 54B is placed in position but the bolts are left loose. Then the user manipulates the handles to bring the first and second cutting blade assemblies together. As this happens the pegs 66 of the blade assembly 54B will engage the seats 70 of the first blade assembly 54A. The angled surfaces 68 and 72 will guide the second blade assembly to a precise alignment wherein the notches 63A-D of assembly 54A will precisely align with the corresponding notches 62 in assembly 54B. Likewise the peg and seat engagement will set the proper separation of the two blade assemblies. Once the proper, aligned position of the second blade assembly has been attained the bolts 82B are tightened down and the tool is ready for use. The slots 37 in the wire guide provide screw driver access to the bolts located underneath the guide.

It will be noted from FIG. 3 that the blade assemblies are interchangeable. When one set of cutting edges becomes worn the assemblies can be exchanged in position with the alternate cutting edges now coming into play. This is made possible by the blade configuration wherein each blade has a set of alignment pegs and seats. All of the blade holes 64 and bolts 82A and 82B are the same size so any blade assembly can be used on both the upper and lower elongated members.

As shown in FIG. 7 the notches in the blade member 56 are sized to sever the insulation layer 88 but not fully to the outside diameter of the conductor 90. This prevents nicking or cutting of the conductor. Also the support members 58 aid in providing accurate mounting of the wire and in addition provide mechanical support and colleting of insulation during the cutting procedure. One of the advantages of this invention is the layered blade design which enables the manufacturer to punch small precision notches through thin gauge metal and secure the blade members accurately through support members and handle blanks with close tolerance control. This eliminates the problems attendant with drilling holes this small. It will be apparent that the blade structure of the present invention could be used on tools other than hand tools. Particularly, the blade assembly could be adapted for use on high production, bench-type strippers. The self-aligning, interchangeable nature of the present design makes it especially suitable for use on production line strippers.

Another advantage of the blade assembly design is the pegs 66 assist in preventing skewing of the members 12A and 12B. When the handles are closed the pegs slide over a portion of the elongated member, as can be seen in FIG. 3. This helps to maintain the elongated members in the same plane.

We claim:

1. A hand tool for stripping the insulation from insulated wire comprising:
    a pair of elongated members pivotally connected together, providing handles at one end for manual manipulation,
    first and second cutting blade assemblies, having cooperating cutting edges,
    means for releasably mounting the first cutting blade assembly in a fixed position on one of the elongated members,
    means for releasably mounting the second cutting blade assembly in an adjustable position to the other elongated member, the entire second cutting blade assembly being adjustable relative to the first cutting blade assembly in a direction parallel to the cooperating cutting edges,
    means for aligning the first and second cutting blade assemblies including at least one alignment peg attached to one of the blade assemblies and extending toward the other blade assembly, and a corresponding seat in the adjacent edge of said other blade assembly, engagement of the peg and seat bringing the first and second blade assemblies into alignment so they are cooperable upon an opening and closing action of the handles to sever the insulation on a wire without cutting the wire itself.

2. The structure of claim 1 further comprising wire guide means mounted on one side of the elongated members for positioning wire at the proper location between the cutting blade assemblies.

3. The structure of claim 2 wherein the wire guide comprises:
    a locator portion having one or more holes therein through which wires may be inserted to position them for stripping,
    a base supporting the locator portion and having stubs extending through arcuate holes in the elongated members with fasteners attached to the stubs to hold the wire guide in the tool, and provide an arcuate floating action of the guide relative to the elongated members upon manipulation of the handle members.

4. The structure of claim 1 wherein the blade assemblies are interchangeable in that each assembly has two opposing cutting edges, one edge provided with the alignment peg arrangement and the opposite edge having the corresponding seat structure so that when the cutting edges of a set of blade assemblies become worn, the assemblies can be interchanged on the elongated members, to provide new cutting edges.

5. The structure of claim 1 wherein the blade assemblies each comprise a blade member and a blade support structure which overlies the blade member to strengthen it.

6. The structure of claim 1 wherein the mounting means for the first blade assembly comprises at least one bolt hole in the elongated member at least one bolt hole in the blade assembly, said holes having the same diameter, and a mounting bolt with nut, extending through said holes, the bolt diameter and the hole diameter being sized to prevent relative motion among the bolt, blade assembly and elongated member.

7. The structure of claim 6 wherein the mounting means for the second blade assembly comprises at least one bolt hole in the blade assembly, at least one hole in the elongated member and a mounting bolt with nut, fitting through said holes, the bolt and blade hole being sized to prevent relative motion therebetween, while the hole in the elongated member has an enlarged diameter over that of the bolt so that, prior to tightening, the blade assembly's position is adjustable, allowing alignment of the first and second blade assemblies upon bringing them together by manipulation of the handle members.

8. In a tool for stripping the insulation from insulated wires of the type having a pair of base members carrying replaceable cutting blades alternately from a non-engaged position to an engaged relation wherein the insulation of a wire between the blades will be cut, an improved cutting blade structure wherein the blades are interchangeable in that each blade has two opposed cutting edges, one edge having an alignment peg and the opposite edge having a corresponding seat, the peg and seat being cooperable upon engagement of a pair of blades to align them.

9. The structure of claim 8 wherein the blade further comprises a thin, metal blade member sandwiched between at least two support members.

10. The structure of claim 8 wherein the cutting blade has a plurality of semi-circular notches punched along the cutting edges, said notches aligning with those of an opposing blade to form insulation-severing apertures.

* * * * *